June 7, 1955     A. C. HUDSON     2,710,344
RADAR MIXER

Filed May 14, 1952     3 Sheets-Sheet 1

Inventor
Arthur C. Hudson
By W. R. Meredith
Attorney

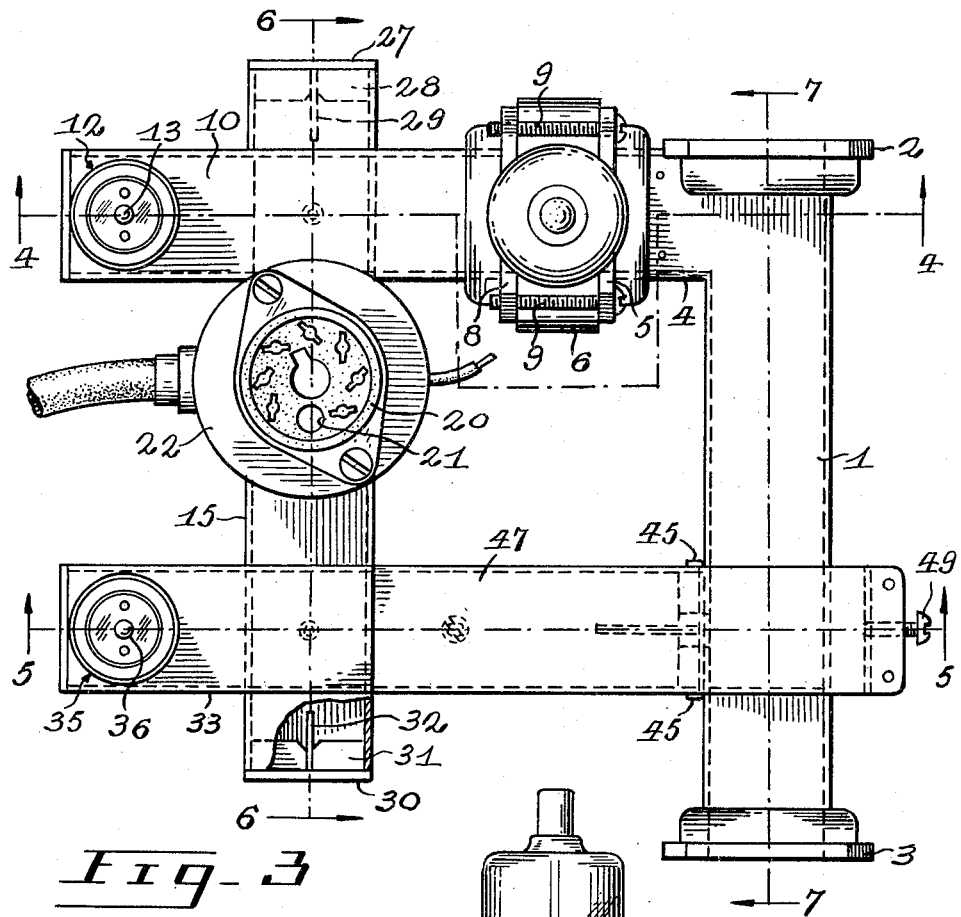
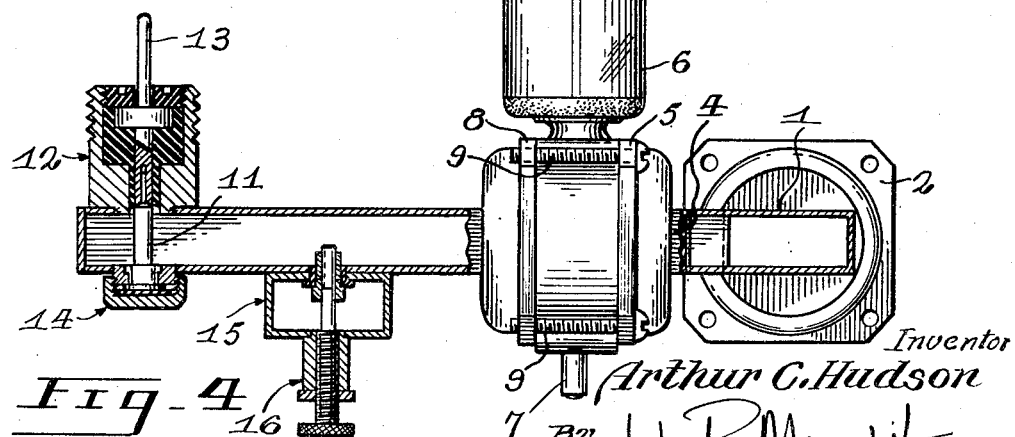

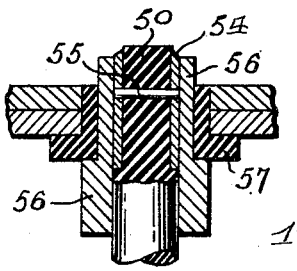
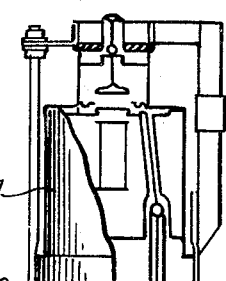
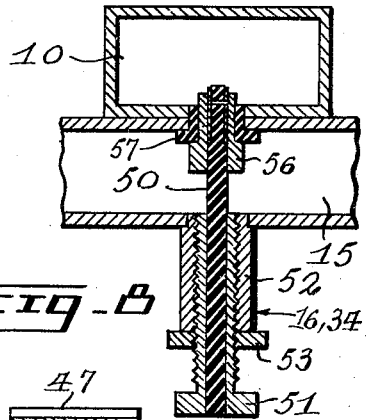
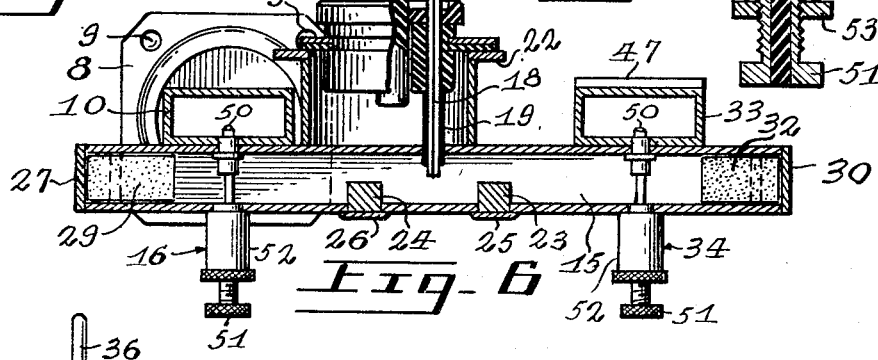
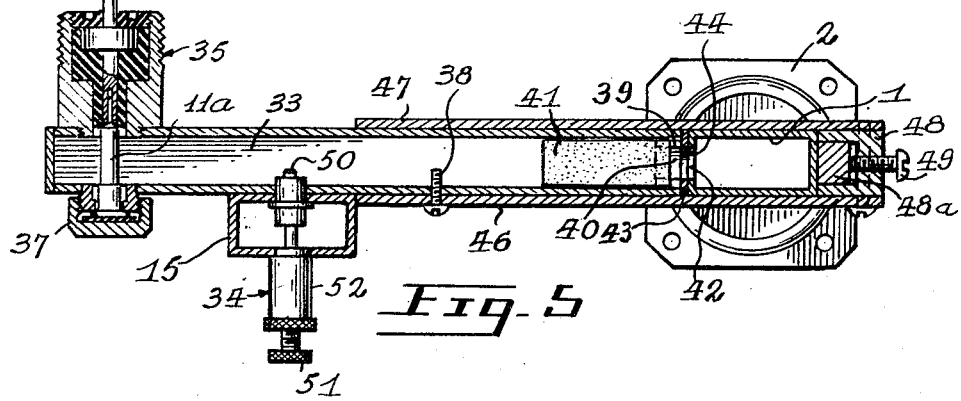
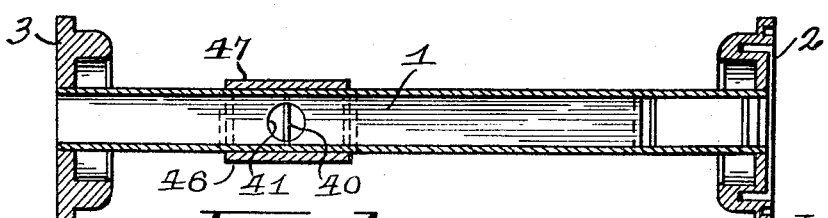

United States Patent Office 2,710,344
Patented June 7, 1955

2,710,344

RADAR MIXER

Arthur C. Hudson, Billings Bridge, Ontario, Canada, assignor to National Research Council, Ottawa, Ontario, Canada, a body corporate of Canada Application May 14, 1952, Serial No. 287,739

5 Claims. (Cl. 250—13)

This invention relates to an improved dual mixer particularly suitable for use in radar installations wherein a single conducting path carries both outgoing microwave energy to the antenna and received signal energy from the antenna, and wherein a sample of such outgoing microwave energy is applied to an automatic frequency control means and such received signal energy is applied to a receiver unit.

While not restricted thereto, the present invention is particularly applicable to radar installations using a velocity-modulated tube of the "klystron" type as the local oscillator and wherein the output of such tube is delivered to a wave guide by means of an output antenna or probe of the tube which protrudes into such wave guide.

In prior art dual mixers, it has sometimes been the practice to provide for adjustability of the local oscillator energy passing to the receiver unit and to the automatic frequency control means by mounting the local oscillator tube in a manner such that the probe output of the local oscillator tube penetrates into the wave guide fed by local oscillator energy and the penetration of the probe is adjustable. With such an expedient, however, the local oscillator tube does not function efficiently. In the preferred embodiment of the present invention the local oscillator tube is preferably mounted in a fixed position and the application of local oscillator energy to the parts of the device where it is intended to be utilized is adjustably controlled elsewhere, as will be described below.

It is the principal object of this invention to remove disadvantages of prior art dual mixers.

Other objects will be apparent to one skilled in the art from an examination of the present specification and the accompanying drawings.

The invention will now be described with reference to the accompanying drawings wherein a preferred embodiment is shown. It will be realized that various changes could be made in the embodiment shown and described, and other apparently different embodiments of the invention could be constructed without departing from the scope thereof. Accordingly it is intended that all matter shown in the accompanying drawings or described herein shall be interpreted as illustrative and not in a limiting sense.

In the drawings, wherein the same reference numerals denote like parts in all figures, Figure 1 shows an oblique three-quarters view of a preferred embodiment of the present invention;

Figure 3 shows a top plan view of the device illustrated in Figures 1 and 2;

Figure 1:
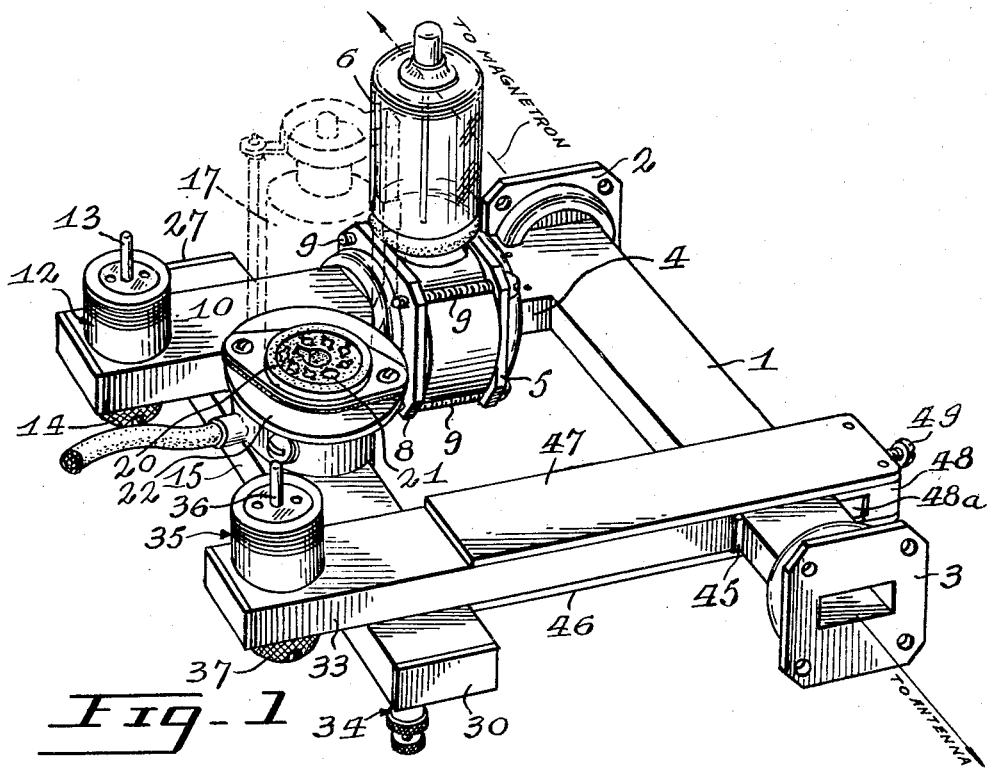

Figures 4, 5, 6 and 7 each show fragmentary cross-sectional views as at the lines "4—4," "5—5," "6—6" and "7—7" respectively in Figure 3, in each case the cross-sectional view being in the direction indicated by the arrows associated with the said lines "4—4," "5—5," "6—6" and "7—7";

Figure 8 shows an enlarged fragmentary cross-sectional view of the adjusting post indicated by reference numeral 28 and/or 32;

Figure 9 shows a still further enlarged view of part of Figure 8, illustrating the tip of shaft 50 and its associated elements.

Referring to the drawings, it will be seen that the most apparent feature of the mixer disclosed herein is a generally rectangular configuration of wave guide members attached to the waxe guide channel connecting a high-power source of microwave energy to the antenna. All of such wave guide members would contain a suitable dielectric, such as air. A magnetron would preferably be used as the source of microwave energy, and the term "magnetron" will be used herein to denote the same, although it should be understood that other sources of microwave energy could be used.

The wave guide connecting the magnetron to the antenna is shown at 1, and wave guide 1 is preferably fitted with conventional coupling members, such as choke coupling 2 and flat coupling 3. In the particular form shown it is contemplated that the side of the device having coupling 2 thereon shall be in the direction of the magnetron, and that the side having coupling 3 shall be in the direction of the antenna, although the invention is in no way restricted to such arrangement.

While a single wave guide 1 is shown for carrying energy to be transmitted to the antenna, and for conveying signal energy in the opposite direction, it will be appreciated that this device could be used in a radar installation having two separate channels for transmitting and receiving.

Attached at right angles to wave guide 1 is a wave guide member denoted by reference numeral 4. The preferred construction is to have wave guides 1 and 4 integral and meeting in a simple T-junction. It is contemplated that the received signal energy will pass from wave guide 1 to wave guide 4, will be later mixed with local oscillator energy in a crystal rectifier and the resultant passed to a receiver (not shown).

A conventional transmit-receive switch denoted as TR switch 6 provided with tuning adjustment 7, is attached to wave guide 4 and on the side of TR switch 6 opposite wave guide 4 is a further wave guide member denoted by 10, the longitudinal axis of which preferably coincides with the longitudinal axis of wave guide 4.

Conventional choke coupling members denoted by 5 and 8 are used to connect TR switch 6 to wave guides 4 and 10 respectively, with the assistance of bolts 9.

At the end of wave guide 10 opposite TR switch 6 is a crystal rectifier denoted by reference numeral 11 (seen in Figure 4). Crystal rectifier 11 is provided with a conventional coaxial output mount 12 and pin 13. The construction or output mount 12 is such as to provide a coaxial line forming a radio-frequency choke of a type well-known in the art.

It is contemplated that the intermediate frequency stage of a signal received (not shown) will be connected to output mount 12. A cap denoted by 14 is used to hold crystal 11 in place and to allow its removal and replacement.

Between TR switch 6 and crystal rectifier 11, the outer wall of wave guide 10 makes mechanical attachment with the outer wall of another wave guide denoted by 15. Wave guides 10 and 15 may be attached for example at right-angles and they may be mechanically fastened together for example, by soldering or brazing their adjacent walls.

Adjustable transfer of local oscillator energy from wave guide 15 to wave guide 10 is provided by means of adjusting post 16, to be described in detail below.

Local oscillator energy is supplied to wave guide 15 by a suitable tube, such as a velocity-modulated tube, shown at 17. Local oscillator tube 17 is provided with a conventional output probe shown at 18, probe 18 having its outer conductor denoted by 19. Local oscillator tube 17 is mounted in socket 20, having opening 21 therethrough for receiving probe 18. Socket 20 is carried by support 22 which is in turn mounted on wave guide 15.

Probe 18 passes into wave guide 15 so that local oscillator energy may be delivered to wave guide 15 and permitted to flow in both directions therein. Under ordinary conditions of operation, it is immaterial whether the outer conductor 19 of probe 18 touches the wall of wave guide 15 through which it passes, since normally the tube shell, the outer conductor 19 and the wave guide 15 will all be at ground potential. If, however, it is desired to operate the tube shell at a potential above ground, thus creating a potential difference between outer conductor 19 and the wave guide 15, it will be found satisfactory to provide an insulating bushing of suitable size and shape between the probe 18 and the wall of wave guide 15.

Various other modifications will occur to one skilled in the art. For example, a choke joint could be used at the point where probe 18 passes through the wave guide wall, but this has not generally been found necessary.

Matching posts of conducting material denoted by 23 and 24 are mounted in wave guide 15 on either side of probe 18, as seen in Figure 6. It is preferable to mount posts 23 and 24 in depressions in the wall of wave guide 15 shown at 25 and 26.

Wave guide 15 makes connection with a further wave guide denoted by 33, for example at right-angles and the manner of connection of wave guides 15 and 33 is preferably similar to the manner of connection of wave guides 10 and 15. An adjusting post denoted by 34 is provided at the junction of wave guides 15 and 33 which may be identical with adjusting post 16.

Wave guide 15 is of such length that it extends in both directions beyond its junctions with wave guides 10 and 33, and a dissipative load is provided at each end of wave guide 15. Cap 27 closes wave guide 15 at its end beyond its junction with wave guide 10, cap 27 being held in place in any suitable manner. For example, cap 27 may have an inner portion 28, particularly seen in Figure 3, of such size that it fits tightly in wave guide 15 so that cap 27 is held in place by friction.

A dissipative load, preferably mounted on the inner portion 28 of cap 27 is shown at 29.

A similar construction is provided at the opposite end of wave guide 15 by cap 30, inner portion 31 and dissipative load 32, as particularly shown at the cut-away portion of Figure 3.

It is contemplated that local oscillator energy will flow from probe 18 in both directions in wave guide 15, and by means of appropriate adjustment of posts 16 and 34 a part of the energy arriving at each post will be passed to wave guides 10 and 33 respectively. The remaining energy will then be dissipated in loads 29 and 32 so as to prevent undesirable reflections back toward probe 18.

Wave guide 33 has mounted therein a crystal rectifier denoted by 11a which is preferably identical with crystal rectifier 11 and preferably has identical associated elements, namely a coaxial output mount denoted by 35, a pin denoted by 36 and a cap denoted by 37. It is contemplated that the intermediate frequency stage of an automatic frequency control means (not shown) will be connected to output mount 35.

At the end of wave guide 33 opposite crystal rectifier 11a connection is made with wave guide 1, as will be described below.

In wave guide 33, between crystal rectifier 11a and wave guide 1, there is provided a matching post denoted by 38, which may be in the form of a simple cap screw.

At the end of wave guide 33 opposite crystal rectifier 11a is a cut-off attenuator denoted by 39. It is preferable if attenuator 39 fits tightly into the end of wave guide 33 with its outer surface flush with the said end of wave guide 33. A suitable adhesive may be used to keep attenuator 39 rigidly in place. Attenuator 39 is provided with an opening denoted by 40.

Disposed on the longitudinal axis of wave guide 35 is a resistive attenuator strip denoted by 41, and again this element is quite conventional. It is preferable to have attenuator strip 41 attached to attenuator 39 on the axis of opening 40.

Wave guide 33 makes connection with wave guide 1 in a manner which will allow compensation of small manufacturing variations in the wave guide components. It would of course be possible to make all the wave guide components very accurately in which case the connection between wave guides 1 and 33 could be in the form of a rigid T-junction, but this would necessitate very close tolerances in the dimensions and would greatly increase the manufacturing cost without any significant improvement in the operation of the device. In order to provide for such compensation a clamping arrangement is provided at the junction of wave guides 1 and 33 to be described below.

A small opening denoted as coupling hole 42 particularly seen in Figure 5, is provided in wave guide 1 preferably positioned so as to be substantially symmetrical about the longitudinal axis of wave guide 33 when wave guides 1 and 33 are in their assembled position. In order to allow for machining tolerances a gasket denoted by 43 made of yieldable conducting material such as lead, is adapted to fit over coupling hole 42 and is provided with an opening 44. It is convenient to provide opening 40 with such diameter and length that a suitable amount of energy is transferred therethrough from wave guide 1 to wave guide 33. Coupling hole 42 may be slightly larger than opening 40, and opening 44 slightly larger than coupling hole 42, in order to prevent misalignment from seriously affecting the amount of transferred energy.

Figure 2:
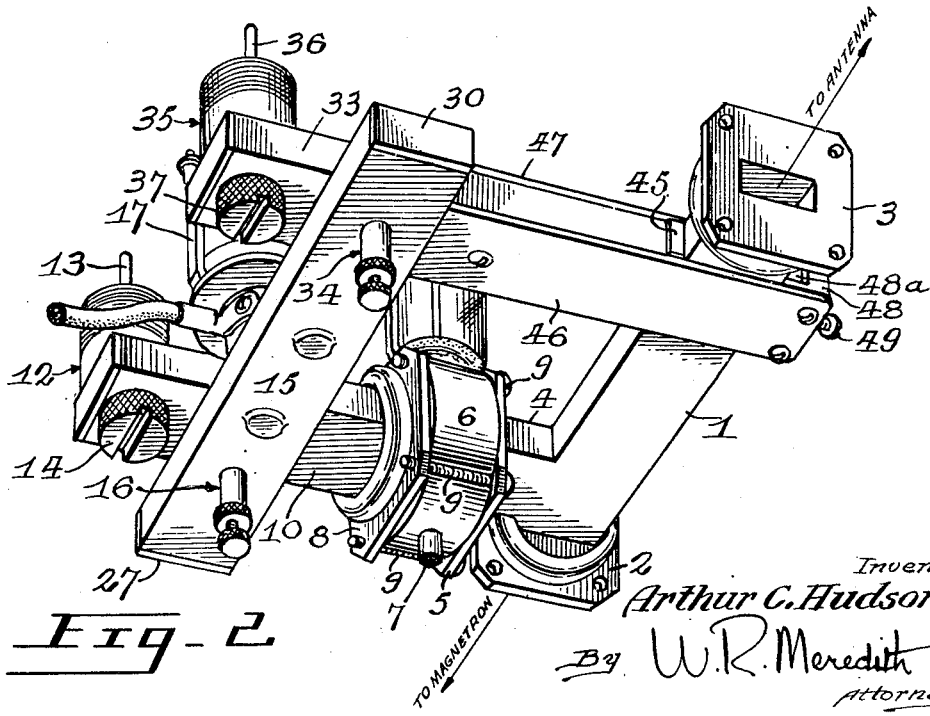
Figure 2 shows a view similar to that shown in Figure 1 wherein the device illustrated in the previous figure is rotated upwardly so as to show several of the external features not visible in Figure 1.

Gasket 43 is preferably rectangular in shape with dimensions at least as great as the external dimensions of the cross-section of wave guide 33, so that gasket 42 is able to cover the end of wave guide 33 facing wave guide 1. While not essential, it is convenient for assembling the device if gasket 43 be provided with positioning lugs 45 formed by short projections bent at right-angles to the main surface of gasket 42 and at each end thereof, shown protruding from the junction of wave guides 1 and 33 in Figures 1, 2 and 3.

In order to provide firm clamping of wave guide 33 against gasket 43 and wave guide 1, the construction shown has been found convenient; two longitudinal bars denoted by 46 and 47 are fastened to wave guide 33 and yoke 48 is rigidly attached to bars 46 and 47 between their ends, the dimensions being such that wave guide 1 may be embraced therebetween as shown. Clamping block 48a and clamping screw 49 enable the assembly to be tightened.

It is within the scope of the present invention, as an alternative to the clamping arrangement just described, to provide a short length of flexible wave guide, for example as part of wave guides 1 or 33, to compensate for small manufacturing variations; such a construction would not however be as strong mechanically as that shown.

In the embodiment of the invention described, wave guides 1, 4, 10 and 33 all have their H-planes in a common plane, and wave guide 15 has its H-plane in a plane parallel, but other configurations are possible, as will be apparent to one skilled in the art.

The adjustable probes 16 and 34 will now be referred to, and by way of example, probe 16 will be described with reference to Figures 8 and 9, probe 34 being preferably identical therewith.

Referring to Figure 8 where there is shown a cross-sectional view of the junction of wave guides 10 and 15 taken through the axis of adjustable probe 16, the central feature of adjustable probe 16 consists of a shaft of dielectric material shown at reference numeral 50 which is preferably made of Bakelite but could be made of many other materials having similar electrical characteristics. Shaft 50 is rigidly attached centrally to a screw member denoted by reference numeral 51 which would preferably be made of brass or other conducting material. Screw member 51 is adapted to threadably cooperate with a sleeve member denoted by 52 which is also of conducting material and electrically connected to the wall of wave guide 15. A lock nut 53 is preferably provided.

Shaft 50 is of such length that it passes through wave guide 15 and protrudes into wave guide 10, and at its end protruding into wave guide 15 it is provided with a conducting sleeve 54 held in place by pin 55, as particularly shown in Figure 9. It is contemplated that to provide coupling between wave guides 10 and 15, sleeve 54 will be moveable and will make electrical contact with a fixed member exposed to the inside of wave guide 15, the latter in the present embodiment being a bushing denoted by 56. Bushing 56 preferably has an internal diameter such that shaft 50 and sleeve 54 make a snug but moveable fit with bushing 56, and in order to minimize friction between sleeve 54 and bushing 56 the latter is preferably made of a porous lubricant-retaining material such as "Oilite." A low-loss insulating bushing denoted by 57 in turn rigidly holds bushing 56 and also makes a rigid fit with the opening from wave guide 10 to wave guide 15.

When shaft 50 is rotated by turning screw 51, by reason of the threadable co-operation and between screw 51 and sleeve 52, shaft 50 is caused to protrude a varying amount into wave guide 10. Because of the electrical connection between sleeve 54 and bushing 56, these latter two members form what is in effect a telescopic probe connecting wave guides 10 and 15, whereby the required degree of local oscillator energy in wave guide 15 is passed to wave guide 10.

Adjustable probes are known in the prior art, but such probes are normally formed of a continuous shaft of conducting material. The disadvantages of such construction is that the conducting material of the probe forms an impedance discontinuity in the wave guide, resulting in undesirable reflections. Where a structure such as the one shown in the accompanying drawings is used, the shaft 50 being made of dielectric material, does not have any significant effect in reflecting energy, particularly if the entire wave guide 15 is filled with a dielectric of similar characteristics to those of shaft 50. The small amount of energy reflected by conducting bushing 56 is negligible.

The operation of the device will be apparent from the foregoing description but for greater certainty will now be outlined.

The radar set of which the embodiment of the present invention forms a part has a cycle of operation which includes a transmitting portion and a receiving portion. During the whole cycle local oscillator tube 17 continuously feeds energy to wave guide 15, portions of which energy are applied to crystal rectifiers 11 and 11a.

Local oscillator energy from the output probe 18 of local oscillator tube 17 travels in both directions in the guide 15. The location and size of matching posts 23 and 24 are such that, in co-operation with the small reflections from probes 16 and 34 and the dissipative effect of loads 29 and 32, the impedance seen in probe 18 looking toward wave guide 15 is such as to insure satisfactory operation of local oscillator tube 17. The design procedure to establish conditions will be apparent to one skilled in the art. While the present method is not suitable for use over as broad a frequency band as a method wherein the local oscillator tube is mounted in a manner approximating the "standard mount" (as described in my copending application Ser. No. 276,719) the present method is satisfactory for most types of operation such as merchant-marine radar where the frequency is restricted to a narrow band.

Of the energy travelling toward probe 16, a large portion is transmitted past this probe and is dissipated in load 29, and substantially the remainder of such energy is transmitted by probe 16 from wave guide 15 to wave guide 10. The amount of such transmission to wave guide 10 may be accurately controlled by turning screw member 51, thus varying the penetration of shaft 50 and sleeve 54 in wave guide 10, and adjusting telescopically the overall length of bushing 56 and sleeve 54.

Local oscillator energy from output probe 18 also travels in the direction of probe 34 and load 32; the function of these components is similar to that of probe 16 and load 29, respectively.

During the transmitting portion of the operation, energy from the magnetron enters wave guide 1 and passes to the antenna. Energy which passes down the wave guide 4 is reflected from the TR switch 6 and returns to the junction of wave guides 1 and 4 in such phase that such energy reinforces energy flowing toward the antenna.

A small fraction of the energy from the magnetron passes to wave guide 33 through the coupling hole 42, the opening 44 in gasket 43, the cut-off attenuator 39 and the resistive attenuator 41, and reaches the crystal rectifier 11a. In order to substantially match crystal rectifier 11a to the characteristic impedance of wave guide 33 in relation to the magnetron energy reaching crystal rectifier 11a the properly positioned closed end of wave guide 33 forms a suitable reflector.

In crystal rectifier 11a the energy from the magnetron is mixed with energy from the local oscillator tube 17, the amount of the latter energy being controlled by probe 34. The difference frequency between that of the magnetron energy and the local oscillator energy is generated in the crystal rectifier 11a and fed through mount 35 to a conventional intermediate frequency amplifier (not shown) and thence to a conventional discriminator (not shown). The output from such discriminator is amplified and applied to the reflector of the local oscillator tube 17 in such polarity as to correct the frequency deviation of tube 17 to the desired value.

During the receiving portion of the operation, the received signal which returns through wave guide 1 from the antenna reaches the mixer after the magnetron has stopped oscillating or is "cold." This energy is substantially matched to the crystal rectifier 11 through the TR switch 6. The energy which passes to the cold magnetron is reflected therefrom in such phase as to reinforce the received energy flowing through the TR switch 6 to the crystal rectifier 11, the total length of the wave guide path to and within the magnetron being properly adjusted to achieve this effect. Alternatively, an anti-TR switch could be used between the junction of wave guides 1 and 4 and the magnetron. Whichever expedient is used, on reaching the crystal rectifier 11 the received energy is mixed in crystal rectifier 11 with energy from local oscillator tube 17 and the resulting beat frequency passed to an intermediate frequency amplifier in the conventional manner.

In order that crystal 11 may be substantially matched to the characteristic impedance of wave guide 10 with respect to the signal energy reaching crystal 11 from wave guide 1, the properly positioned closed end of wave guide 10 forms a suitable reflector.

It will be seen that the invention disclosed herein has many advantages and is a considerable improvement over dual mixers known in the prior art.

I claim:

1. A variable coupling means for use in association with two wave guides for controllably passing microwave energy from one of said wave guides to the other of said wave guides comprising a fixed conducting member exposed to the inside of at least one of said wave guides but insulated from the walls of both wave guides, a moveable conducting member telescopically related to and making electrical contact with said fixed conducting member, said moveable conducting member not making electrical contact with the walls of either wave guide and being capable of protruding into the other of the said wave guides, whereby by telescopically adjusting said moveable conducting member relative to said fixed conducting member the flow of microwave energy between said wave guides may be controllably adjusted.

2. A variable coupling means according to claim 1 wherein there is in addition adjusting means of insulating material attached to said moveable conducting member whereby the position of said moveable conducting member relative to said fixed conducting member may be changed.

3. A variable coupling means for use in association with two wave guides for controllably passing microwave energy from one of said wave guides to the other of said wave guides comprising a fixed conducting member exposed to the inside of at least one of said wave guides but insulated from the walls of both wave guides, a moveable conducting member telescopically related to said fixed conducting member, said moveable conducting member making electrical contact with said fixed conducting member but not with the walls of either of the said wave guides and being capable of protruding into the other of the said wave guides, an insulating shaft connected to said moveable conducting member for positioning said moveable conducting member and screw means connected to said insulating shaft whereby upon rotation of said screw means said insulating shaft is caused to vary its position thereby causing said moveable conducting member to vary its amount of penetration into the other of said wave guides to vary the amount of microwave energy flowing from one of said wave guides to the other of said wave guides.

4. A variable coupling means for use in association with two wave guides for controllably passing microwave energy from one of said wave guides to the other of said wave guides comprising a fixed bushing insulated from the walls of said wave guides and exposed to the inside of at least one of said wave guides, a moveable conducting member telescopically related to said fixed bushing, making electrical contact therewith but not making electrical contact with the walls of either wave guide, said moveable conducting member being capable of protruding into the other of said wave guides, an insulating shaft connected to said moveable conducting member and passing through the wall of one of said wave guides, a threaded member attached to said shaft outside of said wave guides, and a cooperating second threaded member mechanically anchored in relation to said wave guides, whereby when said first threaded member is rotated in relation to said second threaded member said moveable conducting member will be variably positioned relative to said fixed bushing and cause the amount of microwave energy passed from one of said wave guides to the other of said wave guides to be varied.

5. A radar dual mixer comprising a signal channel, a local oscillator channel connected to said signal channel by variable wave guide coupling means, said variable wave guide coupling means consisting of two adjacent wave guides the external walls of which are connected together a fixed conducting member exposed to the inside of at least one of said wave guides but insulated from the walls of both wave guides, a moveable conducting member telescopically related to said fixed conducting member, making electrical contact with said fixed conducting member but insulated from the walls of both wave guides, said moveable conducting member being capable of protruding into the other of said wave guides, whereby telescopically adjusting said moveable conducting member relative to said fixed conducting member causes the flow of microwave energy from said local oscillator channel to said signal channel to be adjustably controlled, and in addition an automatic frequency control channel connected to said local oscillator channel by second variable coupling means similar to said first variable coupling means.

References Cited in the file of this patent

UNITED STATES PATENTS

| | | |
|---|---|---|
| 2,475,474 | Bruck et al. | July 5, 1949 |
| 2,493,066 | Gluyas, Jr. | Jan. 3, 1950 |
| 2,518,931 | Pound | Aug. 15, 1950 |
| 2,547,378 | Dicke | Apr. 3, 1951 |
| 2,567,825 | Pound | Sept. 11, 1951 |
| 2,568,090 | Riblet | Sept. 18, 1951 |
| 2,666,134 | Dicke | Jan. 12, 1954 |

OTHER REFERENCES

"Directive Couplers in Wave Guides," by M. Surdin, Journal of the Institution of Electrical Engineers, vol. 93, PT. IIA, No. 4, 1946, pages 725–726.